(12) United States Patent
Versch

(10) Patent No.: US 7,120,588 B2
(45) Date of Patent: Oct. 10, 2006

(54) SELECTED CLIMATE CHANGE CONTROL OF PET FOOD FORMULATION AND DISTRIBUTION

(76) Inventor: Roman D. Versch, 207 Oakland Rd., Glendora, CA (US) 91741

( * ) Notice: Subject to any disclaimer, the term of this patent is extended or adjusted under 35 U.S.C. 154(b) by 406 days.

(21) Appl. No.: 10/735,183

(22) Filed: Dec. 11, 2003

(65) Prior Publication Data

US 2005/0131753 A1   Jun. 16, 2005

(51) Int. Cl.
*G06Q 99/00* (2006.01)

(52) U.S. Cl. .......................................... 705/1; 426/805

(58) Field of Classification Search ..................... None
See application file for complete search history.

(56) References Cited

U.S. PATENT DOCUMENTS

| 3,846,564 | A | 11/1974 | Malin |
|---|---|---|---|
| 5,120,941 | A | 6/1992 | Reiley et al. |
| 6,493,641 | B1 * | 12/2002 | Singh et al. .................. 702/32 |
| 6,576,280 | B1 | 6/2003 | Bebiak et al. |

FOREIGN PATENT DOCUMENTS

JP      2003288482 A   * 10/2003

OTHER PUBLICATIONS

New 2-Step Program Helps Pudgy Pups Attain and Maintain Healthy Weight, anonymous, PR Newswire Association, Inc. entire document.*

* cited by examiner

*Primary Examiner*—John G. Weiss
*Assistant Examiner*—Michael Fisher
(74) *Attorney, Agent, or Firm*—William W. Haefliger

(57) ABSTRACT

The method of selectively climate controlling the formulation and distribution to points of sale to customers of pet food.

20 Claims, 7 Drawing Sheets

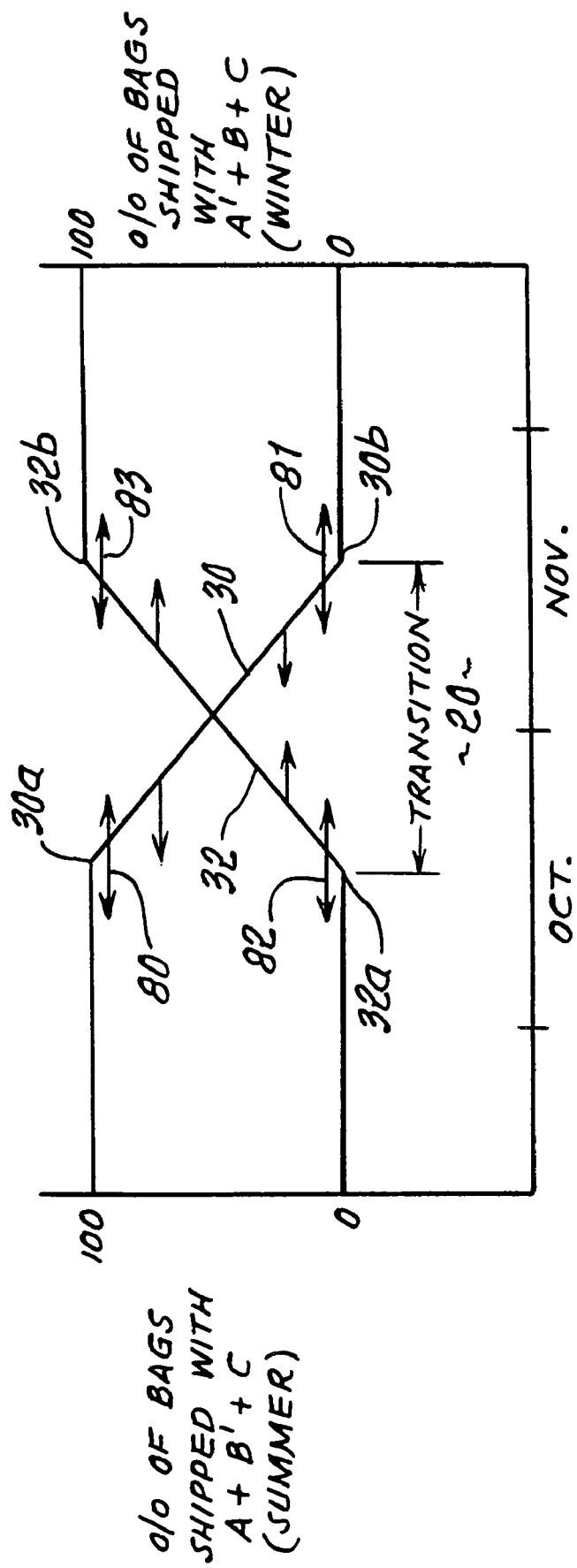

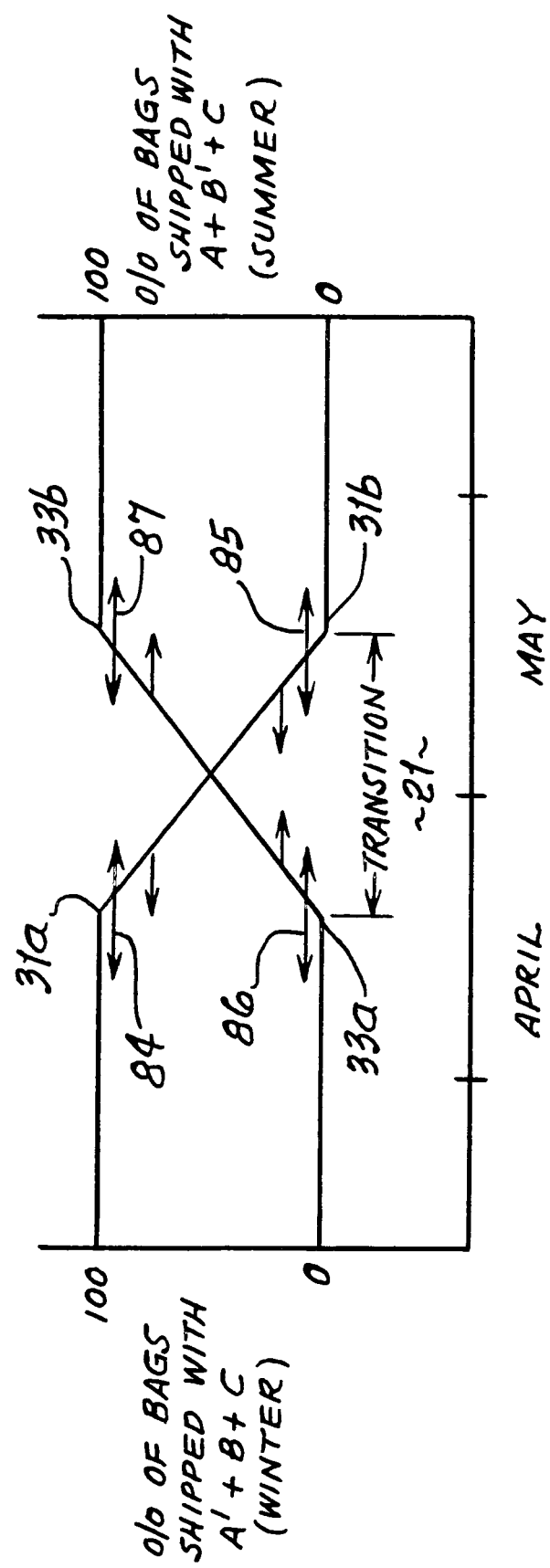

FIG. 5.

| | IngrCode | Ingredient Name | Formula Percent |
|---|---|---|---|
| 1. | 220 | Chicken Meal 16% max ash - (MDF) | 22.200 |
| 2. | 124 | Brown Rice (USDA) | 22.200 |
| 3. | 160 | Oats (Feedstuffs) | 22.200 |
| 4. | 405 | Chicken Fat (USDA) | 6.592 |
| 5. | 250 | Lamb Meal 24% ash (MDF) | 6.252 |
| 6. | 120 | Brewers Rice (USDA) | 6.200 |
| 7. | 272 | Dried Egg Product (ADF) | 6.100 |
| 8. | 970 | Liquid Digest Dog - ADF (MDF) | 2.000 |
| 9. | 180 | Beet Pulp (MDF) | 2.000 |
| 10. | 412 | Sunflower Oil (USDA) | 2.000 |
| 11. | 382 | Flaxseed (USDA) | 1.400 |
| 12. | 801 | Potassium Chloride | 0.400 |
| 13. | 704 | MDF Dry Mineral Premix | 0.150 |
| 14. | 700 | MDF Dry Dog Vitamin Premix | 0.125 |
| 15. | 849 | Choline Chloride (70%) | 0.100 |
| 16. | 770 | Vitamin E (500 IU/g) | 0.061 |
| 17. | 848 | Carnitine | 0.020 |

FIG. 6.

| IngrCode Ingredient Name | Formula Percent |
|---|---|
| 1. 220 Chicken Meal 16% max ash - (MDF) | 20.200 |
| 2. 124 Brown Rice (USDA) | 20.200 |
| 3. 160 Oats (Feedstuffs) | 20.200 |
| 4. 120 Brewers Rice (USDA) | 20.179 |
| 5. 250 Lamb Meal 24% ash (MDF) | 4.927 |
| 6. 405 Chicken Fat (USDA) | 4.869 |
| 7. 970 Liquid Digest Dog - ADF (MDF) | 2.000 |
| 8. 180 Beet Pulp (MDF) | 2.000 |
| 9. 412 Sunflower Oil (USDA) | 2.000 |
| 10. 382 Flaxseed (USDA) | 1.400 |
| 11. 272 Dried Egg Product (ADF) | 1.000 |
| 12. 801 Potassium Chloride | 0.450 |
| 13. 806 Dicalcium Phosphate | 0.200 |
| 14. 704 MDF Dry Mineral Premix | 0.150 |
| 15. 700 MDF Dry Dog Vitamin Premix | 0.125 |
| 16. 849 Choline Chloride (70%) | 0.100 |

FIG. 7.

Nutrient Analysis:

| Nutr | Nutrient Name | Formula Amount | 92.0 %DM Amount | Units |
|---|---|---|---|---|
| 3 | ME (AAFCO) | 3,632.24 | 3,661.92 | kcal/kg |
| 4 | Moisture | 8.73 | 8.00 | % |
| 5 | Protein | 26.88 | 27.10 | % |
| 6 | Fat | 16.90 | 17.04 | % |
| 7 | Crude Fiber | 3.52 | 3.55 | % |
| 10 | Ash | 7.41 | 7.47 | % |
| 14 | Total n-6 Fatty Acid | 4.69 | 4.73 | % |
| 15 | Total n-3 Fatty Acid | 0.40 | 0.40 | % |
| 16 | Calcium | 1.60 | 1.62 | % |
| 17 | Phosphorus | 1.11 | 1.12 | % |
| 19 | Magnesium | 0.13 | 0.13 | % |
| 21 | Potassium | 0.65 | 0.65 | % |
| 23 | Iron | 217.1 | 218.9 | mg/kg |
| 24 | Zinc | 248.2 | 250.3 | mg/kg |
| 30 | Vitamin A | 25,201.5 | 25,407.5 | IU/kg |
| 31 | Vitamin D | 1,870.0 | 1,885.3 | IU/kg |
| 32 | Vitamin E | 600.0 | 604.9 | IU/kg |
| 34 | Thiamin | 4.76 | 4.80 | mg/kg |
| 39 | Pyridoxine | 4.92 | 4.96 | mg/kg |
| 43 | Choline | 2,234.0 | 2,252.2 | mg/kg |
| 49 | Lysine | 1.54 | 1.55 | % |
| 51 | Met-Cystine | 0.86 | 0.87 | % |
| 55 | Tryptophan | 0.26 | 0.27 | % |
| 58 | Carnitine | 200.0 | 201.6 | mg/kg |

FIG. 8.

Nutrient Analysis:

| Nutr | Nutrient Name | Formula Amount | 92.0 %DM Amount | Units |
|---|---|---|---|---|
| 3 | ME (AAFCO) | 3,443.91 | 3,497.91 | kcal/kg |
| 4 | Moisture | 9.42 | 8.00 | % |
| 5 | Protein | 22.95 | 23.31 | % |
| 6 | Fat | 12.90 | 13.10 | % |
| 7 | Crude Fiber | 3.27 | 3.32 | % |
| 10 | Ash | 6.71 | 6.82 | % |
| 14 | Total n-6 Fatty Acid | 3.56 | 3.62 | % |
| 15 | Total n-3 Fatty Acid | 0.36 | 0.37 | % |
| 16 | Calcium | 1.41 | 1.43 | % |
| 17 | Phosphorus | 1.01 | 1.03 | % |
| 19 | Magnesium | 0.12 | 0.12 | % |
| 21 | Potassium | 0.63 | 0.64 | % |
| 23 | Iron | 225.2 | 228.8 | mg/kg |
| 24 | Zinc | 244.2 | 248.1 | mg/kg |
| 30 | Vitamin A | 24,691.5 | 25,078.7 | IU/kg |
| 31 | Vitamin D | 1,870.0 | 1,899.3 | IU/kg |
| 32 | Vitamin E | 295.2 | 299.9 | IU/kg |
| 34 | Thiamin | 4.50 | 4.57 | mg/kg |
| 39 | Pyridoxine | 4.67 | 4.74 | mg/kg |
| 43 | Choline | 1,875.2 | 1,904.6 | mg/kg |
| 49 | Lysine | 1.27 | 1.29 | % |
| 51 | Met-Cystine | 0.70 | 0.71 | % |
| 55 | Tryptophan | 0.22 | 0.22 | % |

SELECTED CLIMATE CHANGE CONTROL OF PET FOOD FORMULATION AND DISTRIBUTION

BACKGROUND OF THE INVENTION

This invention relates generally to methods of formulation and distribution of pet food to optimize nutrition of pets; more particularly, it concerns modification of ingredient formulation of pet foods, on a seasonal basis, as related to distribution destination, and under different climate conditions.

Multiple ingredients are currently included in pet food distributed in containers. The ingredient formulations are established company-by-company, as applicable throughout the United States, and throughout the year.

There is need for a way to enhance pet food nutrient effectiveness, under different weather conditions, considering that at any locality, weather and temperature will change, on a seasonal basis.

It becomes impractical and highly inconvenient (measuring, weighing and calculating) for the pet owner to change pet food formulation on a day-to-day, or week-to-week basis, as weather changes, considering that a large number (typically over 20) of ingredients are included in a typical formulation, and a weight percent balance of ingredients is required.

There is need for a simple, effective pet food supply process, to overcome these problems and difficulties. In this regard, there is need for efficient variance in pet food supply, to maintain optimum metabolic function in companion animals, at varying climate conditions.

SUMMARY OF THE INVENTION

It is a major object of the invention to provide a simple and effective pet food supply process that meets the above need for weather related pet food. Basically, the invention provides a method of selectively climate controlling the formulation and distribution to points of sale to customers of pet food, that includes the steps a) establishing a basic formulation of pet food blended ingredients containing A and B ingredients in addition to C ingredients, where A ingredients are animal based protein, or fat source, B ingredients are plant based carbohydrate, protein source C ingredients are vitamin mineral supplements, cultures b) distributing said A, B and C blended formulation of ingredients to said points of sale, c) relatively increasing or adjusting selected amounts of said A ingredient or ingredients from initial or nominal levels to relatively higher levels for distribution in said basic formulation to selected points of sale subjected to relatively cool climate conditions, to enhance pet nutrition in such cooler conditions, d) and relatively decreasing or adjusting selected amounts of said B ingredient or ingredients from initial or nominal levels to lower levels for distribution in said basic formulation to selected points of sale subject to relatively warm climate conditions, to enhance pet nutrition in such warmer conditions, e) wherein said c) and d) steps occur at different times of the year.

In this regard, most of the basic formulation, without change of ingredients, is shipped to all climates during spring and fall, whereby the A' changed formulation ingredients for winter takes into consideration both a cooler climate due to the area of the country (North) and the winter season; and the B' changed formulation ingredients for summer takes into consideration both warmer climate due both to area of the country (South) and the summer season.

It is another object of the invention to include returning said selected amounts of said A' ingredients to said initial A levels thereof in said basic formulation after said cool climate conditions diminish; and returning said selected amounts of said B' ingredients to said B initial levels thereof, in said basic formulation after said warmer climate conditions diminish.

It is another object of the invention to provide a method as referred to wherein said b) distributing step occurs at selected intervals during summer, fall, winter and spring seasons, said c) step typically occurs during a transition period in the fall season, and said d) step typically occurs during a transition period in the spring season.

An added object is to provide a method as referred to wherein the ingredients in the formulation subject to the c) step are distributed in containers bearing a first distinctive appearance, and the ingredients in said formulation subject to said d) step are distributed in containers bearing a second distinctive appearance. For example, the first and second distinctive appearances may include different climate related colors.

Yet another object of the invention includes the step of varying such selected amounts of said A and B ingredients in accordance with expected indoor and outdoor varied climate conditions.

An additional object includes reducing distribution of said basic formulation of ingredients (i.e. without A') as said step c) is effected; and reducing distribution of said basic formulation of ingredients (i.e. without B') as said step d) is effected.

A further object includes effecting said step c) during a seasonal transition period associated with the fall season; and effecting said step d) during a seasonal transition period associated with the spring season.

A yet additional object indicates the step of formulating a primary proprietary additive, and adding that proprietary additive to the basic formulation of pet food ingredients in conjunction with said c) step, said primary additive characterized as enhancing the effect of said c) step; and/or formulating a secondary proprietary additive, and adding said proprietary additive to the basic formulation of pet food ingredients in conjunction with said d) step, said secondary additive characterized as enhancing the effect of said d) step.

These and other objects and advantages of the invention, as well as the details of an illustrative embodiment, will be more fully understood from the following specification and drawings, in which:

DRAWING DESCRIPTION

FIG. 3 is a graph showing changes in pet food formulations during a first transition period; and FIG. 4 is a graph showing changes in pet food formulation during a second transition period.

FIGS. 5 and 6 are ingredient listings for winter and summer seasons.

FIGS. 7 and 8 are nutrient listings, for the respective FIG. 5 and FIG. 6 ingredient listings.

DETAILED DESCRIPTION

Figure 1:
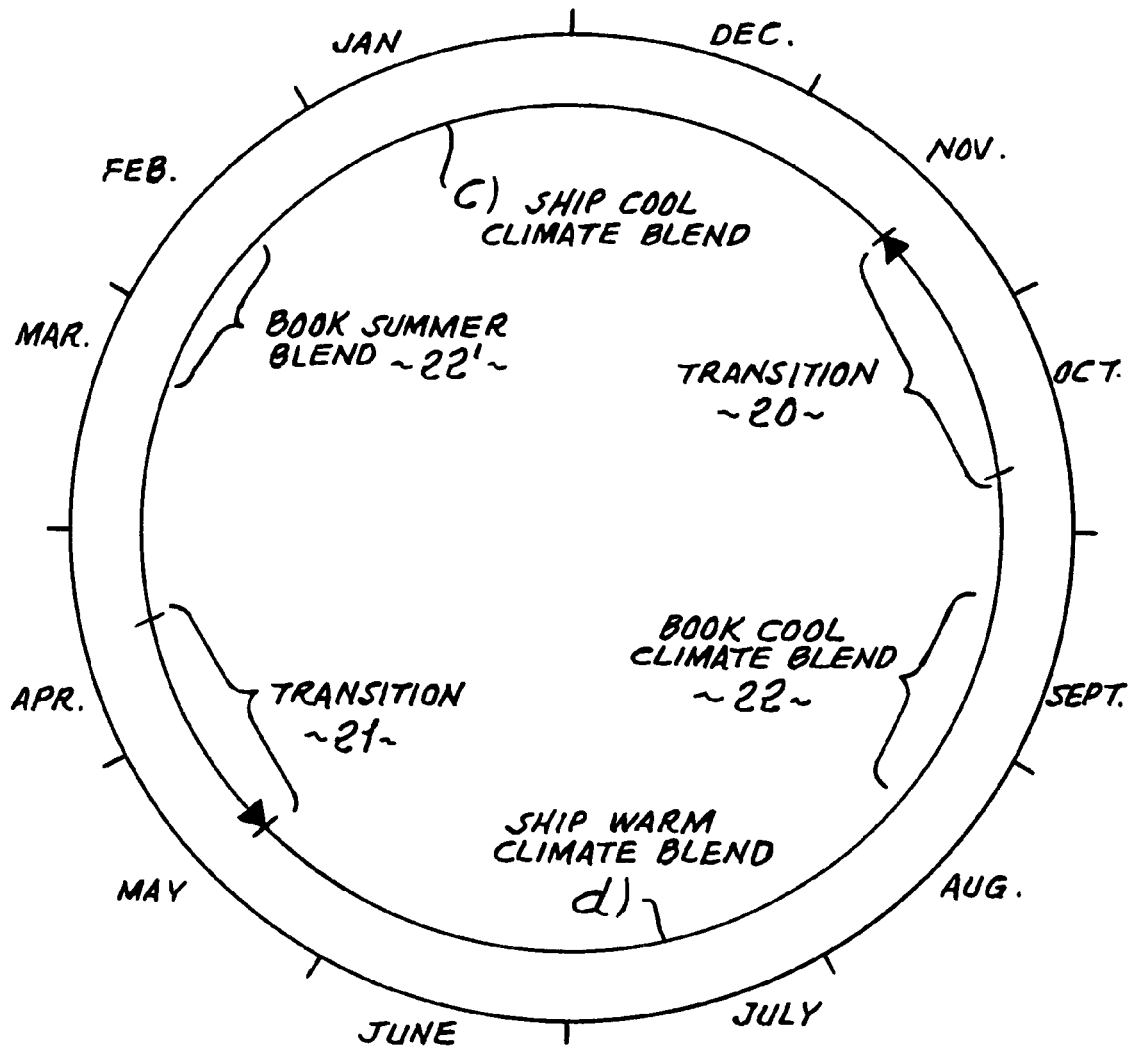
FIG. 1 is a graph showing seasonal changes in shipments of winter and summer blend formulations.

In accordance with the preferred business method of the invention, a basic formulation of pet food blended ingredients is established, for supplying the desired nutrients to the pet. Such ingredients may be designated as A and B ingredients, subject to seasonal relative weight percent variation as will appear, and in addition to remaining C ingredients which do not vary, relative to one another, in weight percent.

As one example, see the following listing of one typical formulation for dog food, containing 42 ingredients. Selected A ingredients, for example are numbered 1, 4, 6 and 8, and selected B ingredients are numbered 2, 3, 5 and 7. The remaining ingredients may be considered C ingredients. The listed A ingredients are subject to selection and may be the same as or somewhat different from B ingredients, and the listed B ingredients are also subject to selection, and may be the same as or somewhat different from A ingredients. Thus, A ingredients may include or consist of certain of the B ingredients, and vice versa. Predominant A ingredients (increase in winter) in weight percent, are chicken meal, brown rice and oats; and predominant B ingredients (decrease in summer) in weight percent, are chicken meal, brown rice, oats and Brewer's rice. See tables in FIGS. 5 & 6.

EXAMPLE OF FORMULATION

1. Poultry meal up in winter, down in summer
2. Brown rice up in winter, down in summer
3. Oat meal up in winter, down in summer
4. Lamb meal up in winter, down in summer
5. Ground (Brewer's) rice up in summer, down in winter
6. Chicken fat (preserved with mixed tocopherols and ascorbic acid) up in winter, down in summer
7. Dehydrated alfalfa meal
8. Fish meal
9. Flax seed
10. Natural flavors
11. Sunflower
13. Brewers dried yeast
14. Monosodium phosphate
15. Choline chloride
16. Rosemary extract
17. Sage extract
18. Ferrous sulfate
19. DL-Alpha tocopherols acetate (source of Vitamin E)
20. Zinc oxide
21. Sodium selenite
22. Manganous oxide
23. Riboflavin supplement (source of Vitamin B Complex)
24. Copper sulfate
25. Zinc methionine
26. Iron proteinate
27. Manganese proteinate
28. Copper proteinate
29. Niacin
30. Vitamin B12 supplement
31. Vitamin A supplement
32. Calcium pantothenate
33. D-Biotine supplement
34. Pyridoxine hydrochloride (Vitamin B6)
35. Calcium iodate
36. Thiamine mononitrate
37. Folic acid
38. Vitamin D3 supplement
39. *Yucca schidigera* extract
40. Papain
41. Dried *bacillus subtilis* fermentation product
42. Dried *aspergillus* fermentation product
43. Dried egg Typical A ingredients are Nos.1, 4 6 & 8; and typical B ingredients are Nos.2, 3, 5 & 7.

Items 13–43 may typically be regarded as a vitamin and mineral set or group listing, to in whole or in part or in part meet APCO standards.

In accordance with the invention, the following steps are carried out:

a) establishing a basic formulation of pet food blended ingredients containing A and B ingredients in addition to C ingredients, b) distributing the A, B and C blended formulation of ingredients to selected points of sale to customers, b) increasing or adjusting selected amounts of the A ingredients from initial levels to higher levels A' for distribution in said basic formulation to selected points of sale subjected to relatively cool climate conditions, to enhance pet nutrition in such cooler conditions, d) and decreasing or adjusting selected amounts of said B ingredients from initial levels to lower levels B' for distribution in the basic formulation to selected points of sale subject to relatively warm climate conditions, to enhance pet nutrition in such warmer conditions.

The "cool climate" formulation A'+B+C is shipped to cooler climates during parts of October and November, all of December through April and parts of May and June; and the warm climate formulation A+B'+C is shipped to warmer climates during parts of April and May, all of June-September, and part of October and November.

Referring to FIG. 1, step b) above occurs during the whole year as diagrammed; however, during the period designated c) the formulation shipped to points of sale to users, in cooler climates, contains increased amounts of the A ingredients, as to A' levels shown by the higher status in the FIG. 5 numbered sequence of ingredients (see for example No.1–3 in FIG. 5); and during the period designated d) the formulation shipped to points of sale to users, in warmer climates, contains lesser or decreased amounts of the B ingredients, as to B' levels, shown by the lower status in the FIG. 6 numbered sequence of ingredients (see for example Nos.1–3 in FIG. 6).

The purpose of such selective formulation, and shipments to different climates, is to enhance pet nutrition in such cooler and warmer climates. Note that steps a) and d) occur at different times of the year.

The following formula timing is related to the earth's position in orbit around the sun, cause and affect of Seasons.

Northern Hemisphere

January—Cool weather Blend

February—Cool Weather Blend
   Book Distributors for Summer Blend. Notify Retailers of upcoming conversion in April.

March—Cool Weather Blend. March 21, Vernal Equinox (time to convert formulas)
   Ship Distributors last two weeks of March Summer Blend.

April—Transition to Summer Blend. If consumers have any Cool Weather Blend left, continue to feed until gone, or mix with Summer Blend.

May—Transition to Summer Blend. Consumer may finish out any remaining product Cool Weather Blend on hand as peak summer season has not yet arrived.

June—Summer Blend. June 21, Summer Solstice

July—Summer Blend

August—Summer Blend
  Book Cool Weather Blend with Distributors.
  Notify retailers of upcoming conversion in October.
September—Summer Blend. September 23 Autumnal Equinox (time to convert formula).
  Ship Distributors last two weeks of September Cool Weather Blend.
October—Transition to Cool Weather Blend. If consumers have any Summer Blend left, continue to feed until gone, or mix with Cool Weather Blend formula.
November—Transition to Cool Weather Blend. Consumer may finish out any remaining product Summer Blend on hand as peak winter season has not yet arrive.
December—Cool Weather Blend. December 22, Winter Solstice.

Transition periods are indicated at 20 and 21 in FIG. 1, and also in FIGS. 3 and 4. During transition period 20, in FIG. 3, the % of bags or containers shipped with A'+B+C ingredients (A' being the increased level of A ingredients as seen in FIG. 5 for example) increases from 0 to 100%, whereas the % of bags shipped with A+B'+C ingredients (B' being the lowered level of B ingredients as seen in FIG. 6 for example) decreases from 100% to 0, as between October and November for example.

During transition period 21 seen in FIG. 4, the % of bags or containers shipped with A'+B+C ingredients decreases from 100% to 0, whereas the % of bags shipped with A+B'+C ingredients increases from 0 to 100%, as between March and April, for example.

Transition lines 30, 31, 32 and 33 have terminations indicated at 30a, 30b, 31a, 31b, 32a, 32b and 33a and 33b. The positions of such terminations may be adjusted, i.e. advanced or retarded (see bands 86–87) in accordance with predicted short term seasonal changes, as for example extended seasonal temperature changes.

FIG. 1 also shows the booking interval 22 in August and September, for A'+B+C formulation shipments for winter climates; and the booking interval 22' in February and March for A+B'+C formulation shipments, for summer climates.

Note distribution slowing at 30 and 31; and distribution increasing at 32 and 33, in FIGS. 3 and 4.

Figure 2:
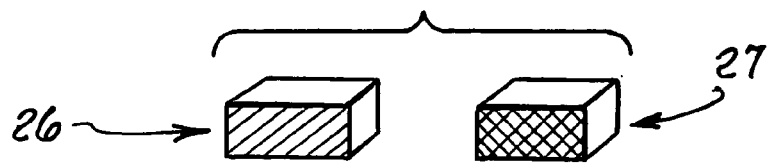
FIG. 2 is a representation of containers or bags for winter and summer blend pet food formulations.

FIG. 2 shows a distribution container 26 for the A'+B+C (winter climate) formulation; and a distribution container 27 for the A+B'+C (summer climate) formulation. Container 26 may have a first color, and container 27 a second color. Other distinctive appearances may be provided.

The invention also contemplates varying said selected amounts of said A and/or B ingredients in accordance with expected indoor and outdoor cool climate temperature conditions; and varying said selected amounts of said B and/or B ingredients in accordance with expected indoor and outdoor warm climate conditions.

The invention also contemplates providing a primary proprietary additive and adding said proprietary additive to the basic formulation of pet food ingredients in conjunction with said c) step, said primary additive characterized as enhancing the nutritional benefit and effect of said c) step; as well as providing a secondary proprietary additive, and adding said proprietary additive to the basic formulation of pet food ingredients in conjunction with said d) step, said secondary additive characterized as enhancing the nutritional benefit and effect of said d) step.

The pet food formulation and distribution are of unique advantage as respects altered formulations to meet specific nutritional requirements of companion animals, as they are affected by changing climatic conditions. In this regard, the inventor's research shows that cooler weather, caused by the earth's position relative to the sun, increases a pet's requirements of nutrients, proteins and fats. Warmer weather, again caused by the earth's position relative to the sun, decreases a pet's requirements of the same ingredients in order to maintain healthy metabolic function. It is also determined by such research that the length of daylight affects the bi-annual shedding of a pet's coat in preparation of the changing seasons. Formulas disclosed herein are designed to provide the proper mixture of ingredients to produce the best coat for the upcoming season, while not stressing the body with too much or not enough of certain other ingredients; again determined by the pet's changing metabolic needs, as caused by different climate conditions.

During cooler climate continuance, (November through May), the northern hemisphere cooler climate pet food product A'+B+C is distributed.

Since the southern hemisphere has the opposite season, the summer blend pet food product A+B'+C is shipped to that region. During the warmer climate season of the northern hemisphere, the summer blend product is shipped, and the southern hemisphere receives the cooler weather blend.

The base formula or formulas consist or consists of high quality ingredients approved by AAFCO for pet food use. The amount of the same ingredients will change to meet specific protein and fat analysis for the appropriate season. For example, pet food ingredients are required to list in order of total amount contained in a formula. The position of an ingredient will move for example from second to fourth, for the opposite season, and return to the second for the previous season, keeping the base formulation similar so as not to upset a pet's digestive tract, yet still meet higher and lower protein and fat objectives.

To this base formula that is adjusted for the season, a certain percent of a selected proprietary blend can be added to enhance the efficacy of the formula. These proprietary formulas may also be sold as under license to distributors of other brands of pet food. Such additives may be packaged and sold separately as on retailer shelves for consumers to add to their current brand of pet food after the introduction of the kibble and canned diets. In the second year, additional formulas for indoor cool weather, outdoor cool weather, indoor summer blend, outdoor summer blend may be introduced to refine nutritional requirements of pets in those specific conditions.

The distribution method of doing business can be directly correlated to the changing seasons. Retailers sales can tracked to slow distribution of current formula at end of season, to allow retailers to sell down current seasonal product, as the upcoming formula comes into the warehouse. Such months are 'transitional' allowing depleting of past season formula and introduction of new seasonal formula. The transition period is set for two months between formula change, October/November and May/June. Any extra formula from the previous season can be held over (by the distributor) for the next change, as the formulas may have a one year shelf life.

I claim:
1. The method of selectively climate controlling the formulation and distribution to points of sale to customers of pet food, that includes the steps
  a) establishing a basic formulation of pet food blended ingredients containing A and B ingredients in addition to C ingredients,
  b) distributing said A, B and C blended formulation of ingredients to said points of sale, c) during a two month period progressively increasing selected amounts of said A ingredients from initial levels to higher levels for distribution in said basic formulation to selected points of sale subject to relatively cool climate conditions, to enhance pet nutrition in such cooler conditions, d) and during a two month period progressively decreasing selected amounts of said B ingredients from initial levels to lower levels for distribution in said basic formulation to selected points of sale subject to selectively warm climate conditions, to enhance pet nutrition in such warmer conditions, e) wherein said c) and d) steps occur at different times of the year, f) and wherein A ingredients and B ingredients may be the same in part or in toto, or similar.

2. The method of claim 1 including returning said selected amounts of said A ingredients to said initial levels thereof in said basic formulation after said cool climate conditions diminish.

3. The method of claim 1 including returning said selected amounts of said B ingredients to said initial levels thereof in said basic formulation after said warmer climate conditions diminish.

4. The method of claim 1 wherein said A ingredients are protein and fat containing.

5. The method of claim 1 wherein said B ingredients include at least two of the following $x_1$) fat
$x_2$) protein
$x_3$) carbohydrate.

6. The method of claim 1 wherein both said A and B ingredients are protein and fat containing.

7. The method of claim 1 wherein said b) distributing step occurs at selected intervals during summer, fall, winter and spring seasons, said c) step occurs and increases during a transition period in the fall season, and said d) step occurs and increases during a transition period in the spring season.

8. The method of claim 7 wherein the ingredients in said formulation subject to said c) step are distributed in containers bearing a first distinctive appearance, and the ingredients in said formulation subject to said d) step are distributed in containers bearing a second distinctive appearance.

9. The method of claim 8 wherein said first and second distinctive appearances are different colors.

10. The method of claim 1 including varying said selected amounts of said A ingredients in accordance with expected indoor and outdoor cool climate temperature conditions.

11. The method of claim 1 including varying said selected amounts of said B ingredients in accordance with expected indoor and outdoor warm climate conditions.

12. The method of claim 1 including slowing distribution of said basic formulation of ingredients as said step c) is effected; and slowing distribution of said basic formulation of ingredients as said step d) is effected.

13. The method of claim 1 wherein said step c) is effected during a seasonal transition period associated with the fall season.

14. The method of claim 1 wherein said step d) is effected during a seasoned transition period associated with the spring season.

15. The method of claim 1 including formulating a primary proprietary additive, and adding said proprietary additive to the basic formulation of pet food ingredients in conjunction with said c) step, said primary additive characterized as enhancing the effect of said c) step.

16. The method of claim 1 including formulating a secondary proprietary additive, and adding said proprietary additive to the basic formulation of pet food ingredients in conjunction with said d) step, said secondary additive characterized as enhancing the effect of said d) step.

17. The method of claim 1 wherein the relative amounts of said C ingredients are not substantially changed, in the resultant formulation wherein A is increased, or B is decreased.

18. The method of selectively climate controlling the formulation and distribution to points of sale to customers of pet food, that includes the steps a) establishing a basic formulation of pet food blended ingredients containing A and B ingredients in addition to C ingredients, b) distributing said A, B and C blended formulation of ingredients to said points of sale, c) during at least a one month period, progressively increasing selected amounts of said A ingredients from initial levels to higher levels for distribution in said basic formulation to selected points of sale subject to relatively cool climate conditions, to enhance pet nutrition in such cooler conditions, d) and decreasing selected amounts of said B ingredients from initial levels to lower levels during at least a one month period, progressively for distribution in said basic formulation to selected points of sale subject to selectively warm climate conditions, to enhance pet nutrition in such warmer conditions, e) wherein said c) and d) steps occur at different times of the year, f) and wherein there are only three of said A ingredients, or only three of said B ingredients which constitute, in collective weight percent, more than 50% of the total weight percent of the total formulation, during winter and summer seasons, and when shipped.

19. The method of claim 18 wherein the weight percents of all three A ingredients are approximately the same for winter and summer seasons.

20. The method of claim 19 wherein the weight percents of all three B ingredients are approximately the same for winter and summer seasons.

* * * * *